US 8,290,142 B1

(12) United States Patent
Lambert (10) Patent No.: US 8,290,142 B1
(45) Date of Patent: *Oct. 16, 2012

(54) ECHO CANCELLATION IN A PORTABLE CONFERENCING DEVICE WITH EXTERNALLY-PRODUCED AUDIO

(75) Inventor: David K. Lambert, South Jordan, UT (US)

(73) Assignee: ClearOne Communications, Inc., Salt Lake City, UT (US)

( * ) Notice: Subject to any disclaimer, the term of this patent is extended or adjusted under 35 U.S.C. 154(b) by 1289 days.

This patent is subject to a terminal disclaimer.

(21) Appl. No.: 11/963,812

(22) Filed: Dec. 22, 2007

Related U.S. Application Data (60) Provisional application No. 60/987,754, filed on Nov. 13, 2007, provisional application No. 60/987,360, filed on Nov. 12, 2007.

(51) Int. Cl.
*H04M 9/08* (2006.01)
(52) U.S. Cl. ............... 379/406.04; 379/202.01
(58) Field of Classification Search ............. 379/202.01, 379/406.04
See application file for complete search history.

(56) References Cited

U.S. PATENT DOCUMENTS

| | | | |
|---|---|---|---|
| 4,360,712 A | 11/1982 | Horna | |
| 5,263,020 A | 11/1993 | Yatsuzuka et al. | |
| 5,477,534 A | 12/1995 | Kusano | |
| 5,577,097 A | 11/1996 | Meek | |
| 5,696,819 A | 12/1997 | Suizu et al. | |
| 5,848,146 A | 12/1998 | Slattery | |
| 5,933,495 A | 8/1999 | Oh | |
| 5,937,060 A | 8/1999 | Oh | |
| 6,192,126 B1 | 2/2001 | Koski | |
| 6,321,080 B1 * | 11/2001 | Diethorn | 455/416 |
| 6,434,110 B1 | 8/2002 | Hemkumar | |
| 6,459,942 B1 | 10/2002 | Markow et al. | |
| 6,526,140 B1 | 2/2003 | Marchok et al. | |
| 6,654,463 B1 | 11/2003 | Leonidov et al. | |
| 6,738,358 B2 | 5/2004 | Bist et al. | |
| 6,744,884 B1 | 6/2004 | Bjarnason | |
| 6,768,796 B2 | 7/2004 | Lu | |
| 6,990,194 B2 | 1/2006 | Mikesell et al. | |
| 7,046,794 B2 | 5/2006 | Piket et al. | |
| 7,050,575 B1 | 5/2006 | Romesburg | |
| 7,099,458 B2 | 8/2006 | Piket et al. | |
| 7,529,566 B2 * | 5/2009 | Rodman et al. | 455/569.1 |
| 7,764,783 B1 | 7/2010 | Pai et al. | |
| 7,912,211 B1 | 3/2011 | Lambert | |
| 2002/0061103 A1 | 5/2002 | Pehrsson | |
| 2003/0133565 A1 | 7/2003 | Chang et al. | |
| 2003/0206624 A1 | 11/2003 | Domer et al. | |
| 2004/0028217 A1 | 2/2004 | Ebenezer et al. | |
| 2004/0041902 A1 | 3/2004 | Washington | |
| 2004/0190701 A1 | 9/2004 | Biage | |
| 2004/0228476 A1 * | 11/2004 | Denninghoff | 379/428.02 |
| 2007/0189508 A1 * | 8/2007 | Knutson et al. | 379/406.08 |
| 2008/0291260 A1 | 11/2008 | Dignan et al. | |

* cited by examiner

*Primary Examiner* — Alexander Jamal
(74) *Attorney, Agent, or Firm* — TraskBritt (57) ABSTRACT

Disclosed herein are conferencing systems that include a conferencing device and a head-processing system, both including selectively enabled speakers, the conferencing device including an acoustic echo canceler that remains operable in the system regardless of whether its internal speaker is selected to be enabled. Detailed information on various example embodiments of the inventions are provided in the Detailed Description below, and the inventions are defined by the appended claims.

14 Claims, 3 Drawing Sheets

ECHO CANCELLATION IN A PORTABLE CONFERENCING DEVICE WITH EXTERNALLY-PRODUCED AUDIO

CROSS-REFERENCE TO RELATED APPLICATIONS

This Application claims the benefit of U.S. Provisional Application No. 60/987,754 filed Nov. 13, 2007 and U.S. Provisional Application No. 60/987,360 filed Nov. 12, 2007, each of which is incorporated by reference in the entirety. In addition, this application is related to U.S. application Ser. No. 11/963,809 filed Dec. 22, 2007 and U.S. application Ser. No. 11/963,810 filed Dec. 22, 2007.

BACKGROUND

The claimed systems and methods relate generally to conferencing products that implement acoustic echo cancellation and connect to an external head-processing device that is capable of injecting sound of a conference into the audible vicinity of a product, and more particularly to conferencing systems that include a portable portion including a speaker and microphone and a connectible head-processing portion that can connect to both distant parties in a conference and the portable portion, the system having at least one speaker controllable by each portion and providing a distant-party signal to an acoustic echo canceler incorporated in the portable portion.

BRIEF SUMMARY

Disclosed herein are conferencing systems that include a conferencing device and a head-processing system, both including selectively enabled speakers, the conferencing device including an acoustic echo canceler that remains operable in the system regardless of whether its internal speaker is selected to be enabled. Detailed information on various example embodiments of the inventions are provided in the Detailed Description below, and the inventions are defined by the appended claims.

Reference will now be made in detail to particular implementations of the various inventions described herein in their various aspects, examples of which are illustrated in the accompanying drawings and in the detailed description below.

DETAILED DESCRIPTION

Conferencing devices are used by many whom wish to avoid the constraints imposed by an ordinary telephone. A telephone includes a handset that is placed to a person's face providing for a conversation with a distant party. A telephone handset is generally not usable by more than one person because the earpiece is configured for sound production to an ear in close proximity, and a microphone may also be configured for local sound pickup. A conferencing device, in contrast, permits a conversation with a distant party through open-air communication, i.e., without a handset. Open-air communications are desirable in many situations, for example, where there is more than one local participant to be engaged in a conversation, or where a single person wishes to maintain mobility and the use of both of his hands.

Some conferencing devices are of the installation-type, meaning that they are intended to be installed into a room and are not mobile. Portable conference devices, in contrast, are portable and relocatable by a user, permitting her to attain the advantages of a conferencing device in virtually any location where a connection to a distant party may be made. Now referring to FIG. 1, one exemplary conferencing device 1 includes a speaker 4 and a microphone 5 for producing and receiving sounds with a participant 6 in an open-air conversation. Speaker 4 and microphone 5 are ordinarily incorporated in the physical product of device 1 for portability, although the speaker and microphone could also be provided as attachables. Hereinafter it is understood that one speaker or microphone may be replaced with a plurality or an array as will be understood by one of ordinary skill, and that reference to a single speaker or microphone is merely for convenience and simplicity of the discussion proceeding below.

Figure 1:
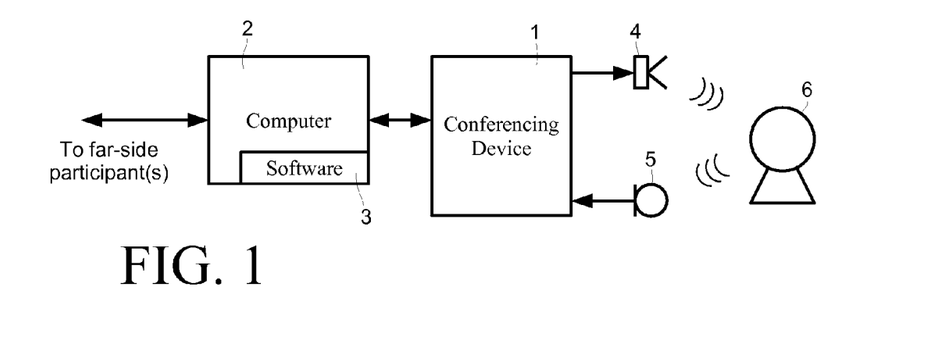
FIG. 1 shows the conceptual elements of a basic portable conferencing device connectible to a computer.

The exemplary conferencing device of FIG. 1 is attachable to a computer, which provides for a connection with a distant party through software 3 and for control of conferencing product 1. Although conferencing device 1 includes manual controls, a conferencing device controlled by software need not include any controls or a display if they are provided in software. Software 3 may create a suitable connection with a distant participant by way of a protocol, for example through VoIP or instant messaging protocols. A portable conferencing device such as 1*a* may also have a stand-alone configuration or other configurations, as desired, in which case controls for establishing and disengaging a connection, such as a numeric keypad, volume controls, on/off hook controls, etc., may be incorporated therein.

Figure 2:
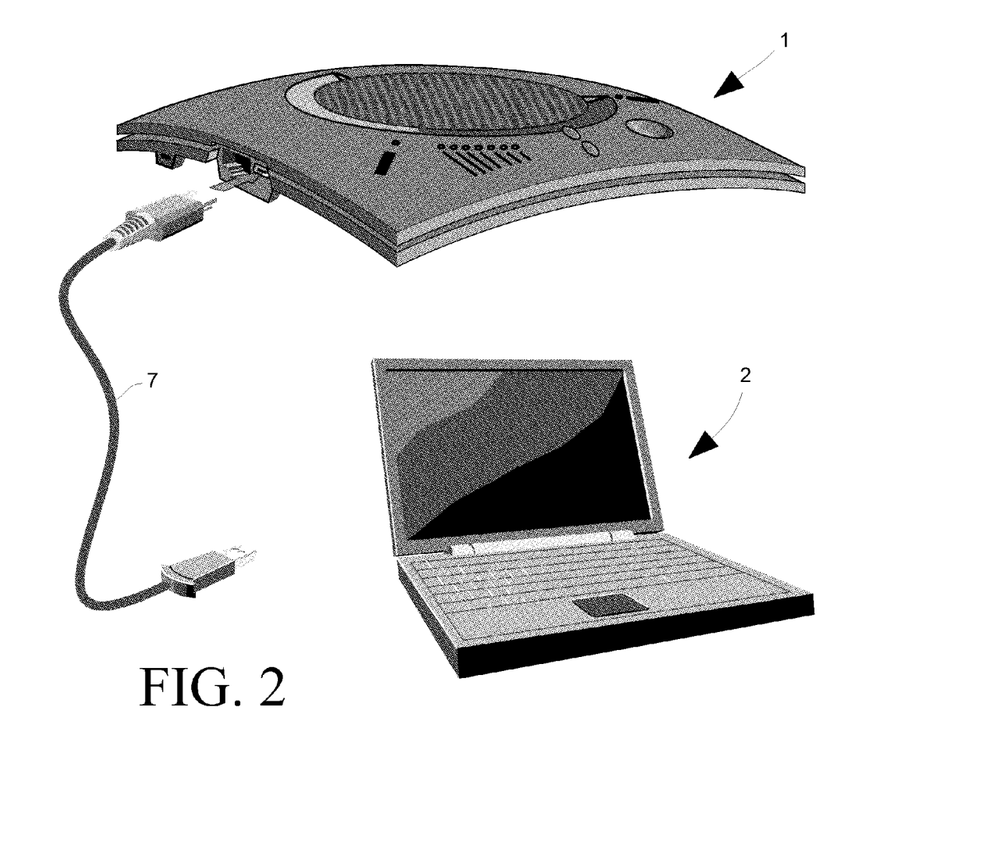
FIG. 2 depicts the connection of an exemplary portable conferencing device to a computer.

Now referring to FIG. 2, a portable conferencing device 1 may connect to a computer 2 through a cable 7, which in this example connects through a USB connection. A USB port, even if low-speed, provides suitable bandwidth for an audio channel between device 1 and computer 2. Other connection methods may be used, such as analog audio in/outs (perhaps provided by speaker and microphone jacks), IEEE 1394, infrared, or other connections, and no particular connection is required so long as requirements of desired use for bandwidth, noise-immunity, etc. are met. As it is used, a portable conferencing device 1 is ordinarily placed on a tabletop or near tabletop height, such as by placing on a seat or a shelf if a table is not available. A portable conferencing device may be made in many sizes, from a device that is small enough to slip into a briefcase or a pocket to a more substantial size that can be carried from room to room. Device 1 is approximately four inches on a side and less than two inches high. A computer 2 is typically be placed nearby at about the same height. Although a laptop is shown, any type of computer may be used within range of cable 7. Furthermore, in the concepts described below a computer 2 is not required, but rather a head device of any kind may be used that incorporates a mode of connecting to a distant party and is capable of supporting a connection to a portable conferencing device.

Figure 3:
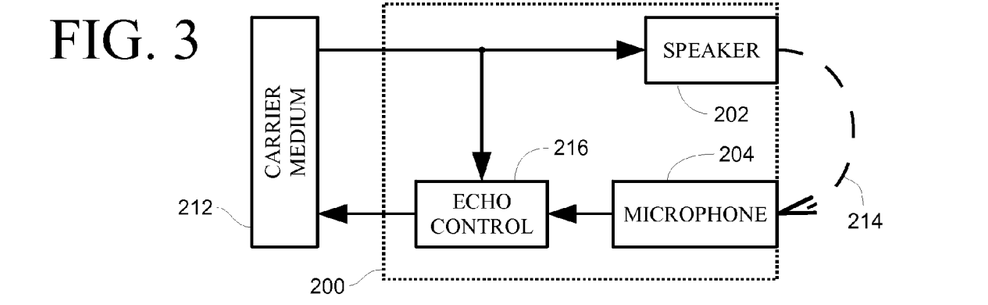
FIG. 3 illustrates the elements of an acoustic echo canceler.

A portable conferencing device such as 1 may incorporate acoustic echo cancellation, which is now described with reference to FIG. 3, simplified for this discussion. A conferencing device 200 is connected to a far-side participant through a carrier medium 212, which might be a telephonic channel, for example. Near-side audio is received at microphone 204 and delivered to the far side device at times through medium 212. As far-side audio is received, device 200 produces audio at speaker 202. The sound produced at speaker 202 is picked up by microphone 204 through a feedback path 214. Thus, the far-side participant will hear an acoustic echo of himself with approximately two-times the carrier medium latency plus path latency 214, if production of sound received from path 214 is not controlled or cancelled.

Device 200 may include an echo controller 216 for reducing acoustic echo. Standard methods of control include operation at half-duplex, and operation at full-duplex with echo cancellation. Half-duplex operation simply cuts off the sound received at microphone 204 when the audible volume at speaker 202 exceeds a pre-selected threshold. Many conferencing products implement half-duplex operation, however that operation carries a disadvantage that participants at only one side of the conference can be heard at any time, and neither side can interrupt or acknowledge the other.

When possible, it is therefore preferable to apply echo cancellation to achieve full-duplex operation. In digital audio systems, echo cancellation can be performed by subtracting off, at controller 216, a modified version of the signal produced at speaker 202, leaving only near-side audio. A conceptual method of cancellation merely applies an attenuation and a delay to the outgoing audio, accounting for the delay and attenuation of feedback path 214. However, in the real world path 214 is complex, including dispersed components from reflections off the several surfaces and persons in proximity to the speaker and microphone.

To deal with that complexity, controller 216 ordinarily implements echo cancellation through use of a finite impulse response (FIR) filter, with the received far-side audio signal as input. The FIR filter utilizes a finite number of coefficients of a length sufficient to cover the longest path 214 of significance expected in operation. The reader should recognize that acoustic echoes will be, in general, of longer duration and greater complexity than line echoes. An acoustic echo canceller therefore requires a much larger number of coefficients to provide echo cancellation, which might cover a number of seconds in a device designed for operation in high-echo rooms (rooms with parallel walls and no carpeting.) These coefficients are applied to a copy of the incoming audio, providing the predicted echo component received at the microphone. The determination of these coefficients is by an iterative method, generally understood by those skilled in the art, and will not be further described here for the sake of brevity. In theory, the FIR coefficients could be determined by the application of a step function to the speaker and a recording of the received audio (in reverse) received at the microphone.

As discussed above, a portable conferencing device may include one or more speakers for producing the far-side audio of a conference. To make the device more portable and/or affordable, it may be that the speakers incorporated into the product are inferior in some way, for example it may be that a pocket device includes a single small form-factor speaker with a limited frequency range. However, even if a portable conferencing device produces adequate sound, it may be that a computer includes a better sound system than the device i.e., better frequency range, directivity, volume or is preferable in some other way.

Figure 4:
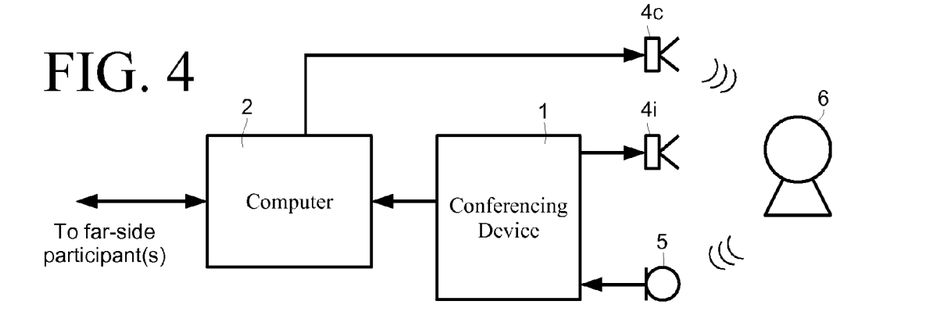
FIG. 4 shows the elements of a system including a computer with a monodirectional speaker path, an external speaker and a connected conferencing device.

Now referring to FIG. 4, a conferencing system similar to that of FIG. 1 is shown, but here computer 2 is directing far-side audio to speaker 4c rather than the conferencing device's internal speaker 4i. Participant 6 can conduct a conversation into microphone 5 and listen by speaker 4c. Here, however, no far-side audio reaches conferencing device 1 from computer 2, because it is desired to have that audio produced at external speaker 4c. Although conferencing device 1 might include an acoustic echo canceler, it is not operable in this configuration because device 1 is starved of far-side audio.

Figure 5:
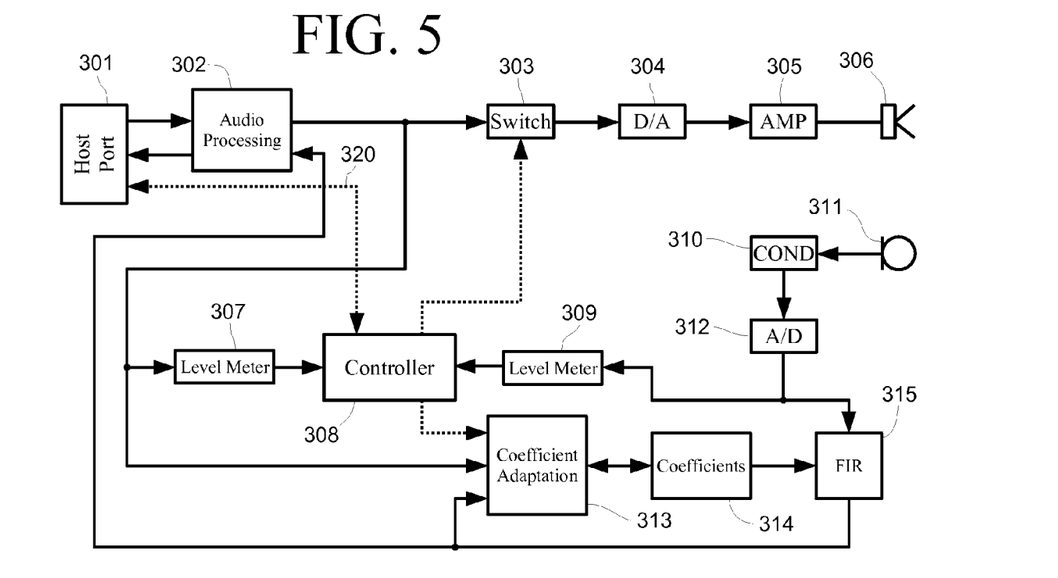
FIG. 5 shows the elements of an exemplary conferencing device that includes an incoming audio path and a switch for controlling the production of audio through its internal speaker.

Now turning to FIG. 5, a conferencing device architecture is shown that permits both transmission of far-side audio using external speakers and the application of echo cancellation. In that architecture, a host port 301 is provided for communication with a host computer or head device. Audio data, shown in solid lines, passes to and from port 301 to an audio processing block 302 for buffering, decoding, encoding and other operations that are desired to perform on audio data in proximity to port 301. Incoming, far-side audio data may pass from processor 302 through a switch 303, where it is converted into open-air audio through a digital to analog converter 304, amplifier 305 and speaker 306. Speech from local participants is received at microphone 311, and conditioning circuitry 310 may be included to condition the signal for further processing, for example by application of filtering. That analog signal is converted at some point to a digital one by converter 312, which signal passes through the application portion of the echo canceler, FIR filter 315, and to a controller 308 by way of an audio level-sensing meter 309. Echo-canceled audio passes from FIR filter 315 through audio processing block 302 to port 301 for transmission to far-side parties through the computer or head-processing device. The echo canceler includes an adaption engine 313 fed with the incoming audio level and the outgoing audio in this architecture, and may also be fed with the microphone audio if the adaption algorithm so requires. Cancellation coefficients 314, used by FIR 315, are adapted by adaption engine 313 to arrive at an echo cancellation solution for particular environment in which the microphone 311 is in operation. Adaption engine 313 is controlled by controller 308 using meters 307 and 309 such that adaption occurs generally only when far-side audio is present and local participants are not speaking.

Host port 301 includes an additional control channel 320 communicating commands to controller 308. One particular command controls the operation of switch 303, which as described above in one configuration passes incoming audio for production at speaker 306. In another configuration switch 303 blocks the incoming audio, which is not produced at speaker 306. This can be accomplished, for example, by passing a zero signal to converter 304 or in the analog domain by feeding a signal tied to an audio AC ground.

However, merely blocking the incoming signal from reaching speaker 306 is not sufficient where echo cancellation is to continue. Therefore, after the sending of a command to configure switch 303 to block, a host may continue to send far-side audio to the conferencing device through port 301. Following a switching command, either to block or unblock at switch 303, echo cancellation coefficients will no longer be adapted for the speakers producing far-side audio in the environment of microphone 311. If no action is taken, a period of ineffective echo cancellation may occur which may result in far-side participants hearing some degree of echo, particularly if the system is switched from or to a state where speaker 306 is solely producing far-side audio. If that is not acceptable, a conferencing device may take echo cancellation remedial steps, including accelerated coefficient adaption or operation in half-duplex mode for a period of time or until a recognition that the coefficients have re-adapted.

Figure 6:
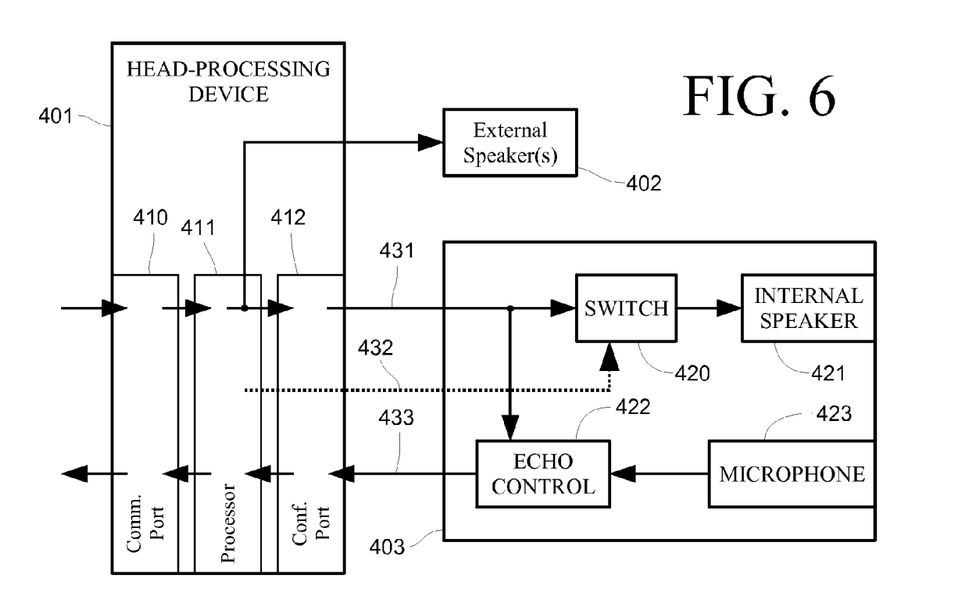
FIG. 6 shows the elements of an exemplary conferencing system including a head-processing device having a bifurcated incoming audio path and a conferencing device with a switch for controlling the production of audio through its internal speaker and a switch control path.

Now turning to FIG. 6, another architecture is shown whereby a head-processing device 401 is used in a conferencing system. Device 401 is referred to as a head-processing device because it sits at the head of the communication stream(s) between conferencing device 403 and any far-side parties. Head-processing device incorporates a communication port 410 for establishing one or more audio links with distant parties, which link might be made through an POTS line, VoIP, or other link as desired. A processor 411 may be included to process the several streams passing through head-processing device 401, providing for encoding, decoding, buffering, sampling, user controls and any other desired processing function. A link to conferencing device 403 is made through conferencing port 412, which could be an analog or digital link that includes an incoming audio stream 431, an outgoing audio stream 433 and a control stream 432. Under a first configuration, the internal speaker 421 of conferencing device 403 is used, and correspondingly echo controller 422 and microphone 423 provide echo cancellation. The echo canceled signal is passed through conferencing port 412, processor 411 and communication port 410 to far-side parties.

Also in head-processing device 401, and external speaker 402 may be connected thereto and may provide far-side audio to local participants. In its first configuration, conferencing device 403 will apply this additional audio as part of the echo cancellation process, and thus the presence of an external speaker does not generally prevent effective echo cancellation. In a second configuration, conferencing device 403 does not produce audio at internal speaker 421, which is accomplished by configuring switch 420 to the "off" state by either feeding a DC signal to speaker 421, turning off its amplifier, or by other means. In that configuration, head-processing device far-side audio through external speaker 402. In either configuration, head processing device continues stream 431 so that echo cancellation at device 403 can be performed. In the event of a state change at switch 420, device 403 may take remedial measures to adapt to the new acoustic echo profile in the environment.

As to command channel, this may exist as a separate wire or contact in the interface between head processing device and conferencing device 403. In other cases, it may be desirable to implement streams 431, 432 and 433 into a single communications channel, such as in a serial-bus. In that event a protocol may be defined between conferencing port 412 and conferencing device 403 for the communication of bi-directional audio and commands. Commands may also be communicated over an audio channel, either in the audible frequency range or otherwise, for example by the transmission of an ultrasound tone from the head-processing device to the conferencing device. A communication channel may also be omitted, if a user control is provided in a device such as 403. These methods of communication may be used in any system of the types disclosed herein.

In the operation of a system containing a head-processing device 401 and an operational external speaker 402, consistency between the delivery of audio to the external speaker and the conferencing device over stream 431 is helpful to avoid artifacts in the echo-canceled audio stream. Artifacts may occur where the latency between transmission of audio from processor 411 to speaker 412 and from processor 411 to conferencing device 403 changes over time. In the ideal case, a clock exists between head-processing device 401 and conferencing device 403 by which both are kept in synchronization. Such a clock may be implemented through the scheduled delivery of digital packets from through conferencing port 412, for example with a fixed-size payload. In that case, conferencing device 403 may adapt its clock rate accordingly.

However, it may not be possible to regulate the delivery of a clock signal or packets from head-processing device 401 to conferencing device 403, or it may be desirable to avoid the expense and complication of synchronization. In that event, where conferencing device 403 includes an adapting echo canceler, a slow drift will not substantially affect echo cancellation. For example, it may be that the audio link to the far-side participants has a sample rate of 16 kHz, or a sample period of 62 µs. A synchronization drift of a few microseconds over a period of about one minute will not substantially affect the echo cancellation, presuming that adaption takes place within about that one minute period of time. Recognize now that the conferencing device need not be synchronized to the far-side equipment; head-processing device 401 may compensate by adding or skipping far-side samples so long as the audio stream produced at speaker 402 and delivered to conferencing device 403 includes the same additions and/or deletions. Even if the accuracy of these clocks is not consistent, some degree of echo cancellation may still be enjoyed, particularly at lower frequencies or where a low-pass filter is used. Digital communication between head-processing device 401 and a conferencing device 403 in a synchronous mode may be used as a countermeasure to drift.

Figure 7:
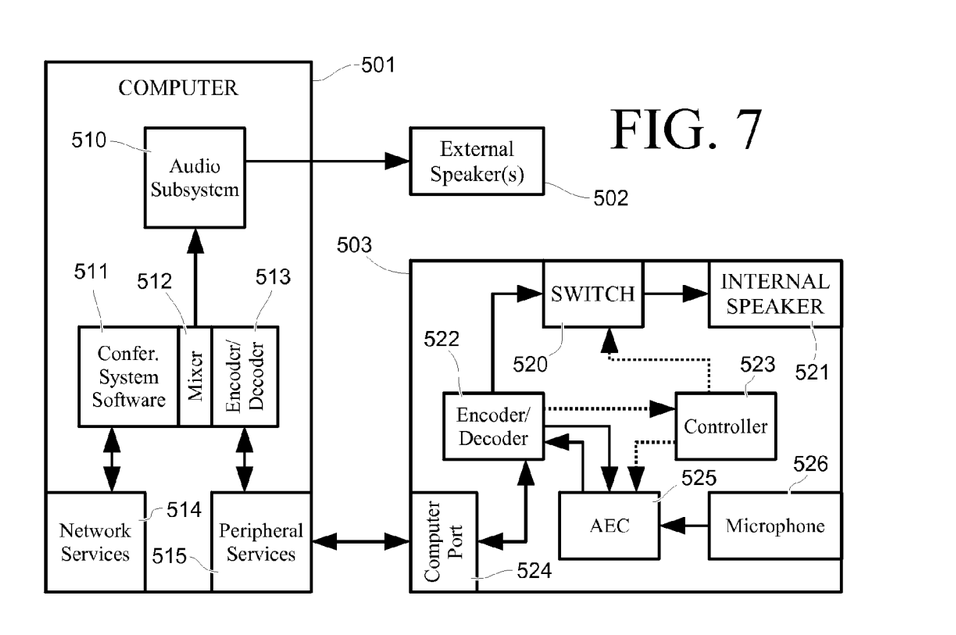
FIG. 7 shows an exemplary audioconferencing architecture using a computer communicating with a conferencing device using a digital communications port.

Now turning to FIG. 7, a more particular embodiment of that shown in FIG. 6 is now described including a computer 501 and a conferencing device 503 that communicates through a digital computer interface. Computer 501 may be an ordinary personal computer having an audio subsystem 510 controllable through software configuration, which may have a master software audio process that receives audio data from programs that is produced at one or more external speakers 502. In this example communication with distant parties is accomplished through a computer network and network services 514 implemented for programs. Communication to conferencing device 503 is through peripheral services 515 provided as an operating system service for programs.

User-domain software is implemented on computer 501 to enable a conference with a distant party. This software includes an encoder/decoder 513 for communications with conferencing device and general software 511 for implementing user interfaces and for initiating and maintaining a network connection with a distant party. Also in software is a mixer 512 that sends far-side audio data to audio subsystem 510, conferencing device 503 through encoder/decoder 513, or both.

Conferencing device 503 implements a computer port 524 for communications with computer 501 and encoder/decoder 513 through services 515, and through encoder/decoder 522 on device 503. Encoder/decoder processes at least three data streams, which are incoming audio data to switch 520, outgoing audio data from acoustic echo canceler 525 and command data controller 523. Controller 523 may control several functions on device 503, and here those functions include control of switch 520 and AEC 525. In an alternate configuration, witch 520 is not controlled by controller 523 but by a user-control on the housing of the device. Microphone 526 receives and delivers local audio to AEC 525 which is also fed far-side audio from decoder 522, and internal speaker 521 may produce far-end audio if switch 520 is so configured.

Now although particular systems, functions and methods have been described above, one of ordinary skill in the art will recognize that these are adaptable to related open-air conferencing products and thus the inventions are not limited to the particular implementations described herein. It is to be understood that although the processors and controllers in the various examples herein are shown as individual components for the purposes of discussion, any or all of these can be implemented an a single processor or processing element, or in distributed processing elements as desired and the claimed inventions are not limited to the particular configurations shown. Likewise, although the described functions have been described through the use of block diagrams and in hardware, one of ordinary skill in the art will recognize that most of the functions described herein may be implemented in software as well. Additionally, the exact configurations described herein need not be adhered to, but rather the diagrams and architectures described herein may be varied according to the skill of one of ordinary skill in the art. Moreover, although reference is made to electronics, circuitry and software in the exemplary systems, it is to be recognized that audio functions implemented in electronics/circuitry may often be implemented in software, and vice versa, and thus it is considered within the scope of the inventions that software elements might be implemented in electronics with or without a processor executing software, and electronic aspects can likewise be implemented in software.

What is claimed:

1. A head-processing device, comprising:
   a communications port configured to convey a first bi-directional audio link with a distant conferencing party,
   an audio processor operably coupled to the communications port and configured to operably couple to one or more external speakers,
   a conferencing port operably coupled to the audio processor and configured to convey a second bi-directional audio link with a conferencing device; and
   wherein said audio processor is operable to:
      establish the first bi-directional audio link with the distant conferencing party through said communications port and to operate a bi-directional communications stream between said communications port and said conferencing port; and
      bifurcate an incoming stream passing from said communications port to said conferencing port so that it passes both to said conferencing port and the one or more external speakers.

2. A head-processing device according to claim 1, wherein:
   said conferencing port is operable to maintain a control channel to the conferencing device connected thereby;
   said processor is operable to send internal speaker commands to the conferencing device over the control channel; and
   under conditions that a command has been sent to turn off an internal speaker on the conferencing device, said processor continues to pass the incoming stream to the conferencing device connected through said conferencing port.

3. A head-processing device according to claim 1, further comprising a user control whereby said external speaker can be enabled or disabled.

4. A head-processing device according to claim 3, wherein said incoming stream is not bifurcated at times when said external speaker is disabled.

5. A head-processing device according to claim 1, wherein said head-processing device is a computer.

6. A head-processing device according to claim 1, wherein the processor is further operable to include a scheduled delivery of the incoming stream passing from the communications port to the conferencing port to synchronize audio output from a speaker of the conferencing device with audio output of the one or more externals speakers.

7. A conferencing system including a conferencing device with a microphone, the system applying acoustic echo cancellation regardless of whether an internal speaker is operating, the system comprising:
   a head-processing device comprising a bi-directional communications port, an audio processor, a conferencing port, and an external speaker, wherein said bi-directional communications port is operable to establish a bi-directional audio link with a distant conferencing party, wherein said conferencing port is operable to maintain a bi-directional audio link with a conferencing device, wherein said processor is operable to establish a bi-directional audio link with a distant party through said communications port and to operate a bi-directional communications stream between said communications port and said conferencing port, and further wherein said processor is operable to bifurcate the incoming stream passing from said communications port to said conferencing port so that it passes both to said conferencing port and said speakers;
   a conferencing device comprising an internal microphone, an internal speaker, a switch whereby the operation of said internal speaker may be enabled or disabled, and an acoustic echo canceler operable to apply acoustic echo cancellation to a signal received at said microphone under conditions that a far-side audio stream is provided as input; and
   a control for disabling said internal speaker;
   whereby during a conference regardless of whether said internal speaker is enabled or disabled, said acoustic echo canceler is fed with a signal corresponding to the far-side audio produced at the totality of speakers in the system.

8. A conferencing system according to claim 7, further comprising a control channel between said head-processing device and said conferencing device, wherein said head-processing device implements a user control and is further operable to send internal speaker commands to the conferencing device over the control channel.

9. A conferencing system according to claim 7, wherein said control is incorporated to said conferencing device.

10. A conferencing system according to claim 7, wherein said incoming stream is not bifurcated at times when said external speaker is disabled.

11. A conferencing system according to claim 7, wherein the processor is further operable to include a scheduled delivery of the incoming stream passing from the communications port to the conferencing port to synchronize audio output from a speaker of the conferencing device with audio output of the one or more externals speakers.

12. A conferencing system according to claim 7, the sample rate used to produce sound at said external speaker and the sample rate used to sample audio at said microphone are substantially the same in that the two streams do not drift from each other sufficiently to cause loss of echo canceler coefficient adaption.

13. A conferencing system according to claim 7, wherein said conferencing system engages remedial echo canceler adaption steps when the enablement/disablement state of said internal speaker is recognized to have changes.

14. A method of applying acoustic echo cancellation in a system including a conferencing device including an internal speaker a microphone, an acoustic echo canceler and a connection to a head-processing device operably coupled to an external speaker, comprising the acts of:

establishing a connection between the head-processing device and at least one distant party;

providing audio received from the at least one distant party to local participants through either the internal speaker, the external speaker, or both;

providing the audio received from distant parties to the conferencing device;

at the conferencing device, applying acoustic echo cancellation to the signal received at the microphone relative to the audio received from the at least one distant party;

providing the echo canceled audio signal to distant parties by way of the head-processing device;

at desired times, disabling the internal speaker and enabling the external speaker;

at times when the internal speaker is disabled, bifurcating the incoming audio stream at the head-processing device between the external speaker and the conferencing device and continuing to provide the audio from the at one distant party to the acoustic echo canceler.

* * * * *

UNITED STATES PATENT AND TRADEMARK OFFICE
CERTIFICATE OF CORRECTION

PATENT NO.      : 8,290,142 B1
APPLICATION NO. : 11/963812
DATED           : October 16, 2012
INVENTOR(S)     : David K. Lambert It is certified that error appears in the above-identified patent and that said Letters Patent is hereby corrected as shown below:

In the drawings:

In FIG. 4, change the text "Dcvicc" for reference numeral --1-- to --Device--

In FIG. 7, change the text "Subsystcm" for reference numeral --510-- to --Subsystem--

In FIG. 7, change the text "Mixcr" for reference numeral --512-- to --Mixer--

In FIG. 7, change the text "Encodcr/Dccodcr" for reference numeral --513-- to --Encoder/Decoder--

Signed and Sealed this
Seventeenth Day of December, 2013

Margaret A. Focarino
*Commissioner for Patents of the United States Patent and Trademark Office*

CERTIFICATE OF CORRECTION (continued)
U.S. Pat. No. 8,290,142 B1

Replace FIG. 4 with the following amended figure:

Replace FIG. 7 with the following amended figure:

FIG. 6

FIG. 7